United States Patent [19]

Jeppesen, III et al.

[11] Patent Number: 5,088,092
[45] Date of Patent: Feb. 11, 1992

[54] WIDTH-EXPANSIBLE MEMORY INTEGRITY STRUCTURE

[75] Inventors: James H. Jeppesen, III, El Toro; Bruce E. Whittaker, Mission Viejo, both of Calif.

[73] Assignee: Unisys Corporation, Blue Bell, Pa.

[21] Appl. No.: 441,128

[22] Filed: Nov. 22, 1989

[51] Int. Cl.⁵ .............................................. G06F 11/10
[52] U.S. Cl. .................................. 371/49.3; 371/51.1
[58] Field of Search .................. 371/49.1, 49.3, 51.1; 365/201

[56] References Cited

U.S. PATENT DOCUMENTS

| 4,019,033 | 4/1977 | Parmet | 371/51.1 |
| 4,271,521 | 6/1981 | Mahmood | 371/51.1 X |
| 4,295,219 | 10/1981 | Draper | 371/51.1 |
| 4,355,393 | 10/1982 | Kubo | 371/51.1 |
| 4,464,755 | 8/1984 | Stewart | 371/51.1 |
| 4,800,535 | 1/1989 | McAlpine | 371/49.3 X |
| 4,809,178 | 2/1989 | Kim | 371/51.1 |
| 4,809,279 | 2/1989 | Kim | 371/51.1 |
| 4,849,978 | 7/1989 | Dishon | 371/51.1 X |

Primary Examiner—Robert W. Beausoliel
Attorney, Agent, or Firm—Alfred W. Kozak; Mark T. Starr

[57] ABSTRACT

A width-expansible ROM/PROM memory structure includes a plurality of duplicate-type ROM/PROM data memory chips and includes a duplicate-type ROM/PROM parity memory chip. Stored data words of "n" bits can be stored in the memory chips and combined in output to provide a data output word of k×n data bits to provide an expanded output data word, where k is the number of data memory chips. Selection means are provided to operate with either an odd parity format or an even parity format.

2 Claims, 3 Drawing Sheets

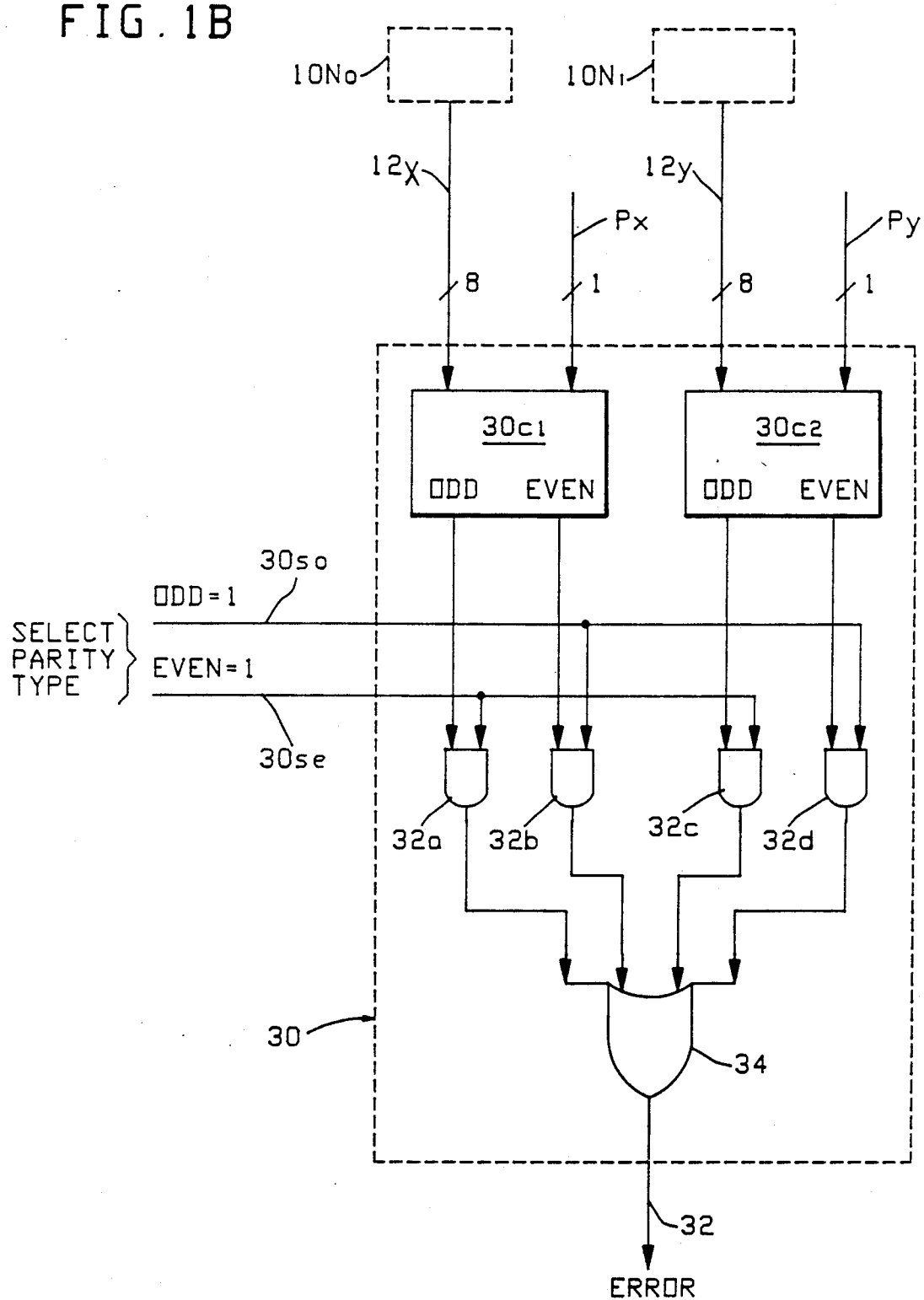

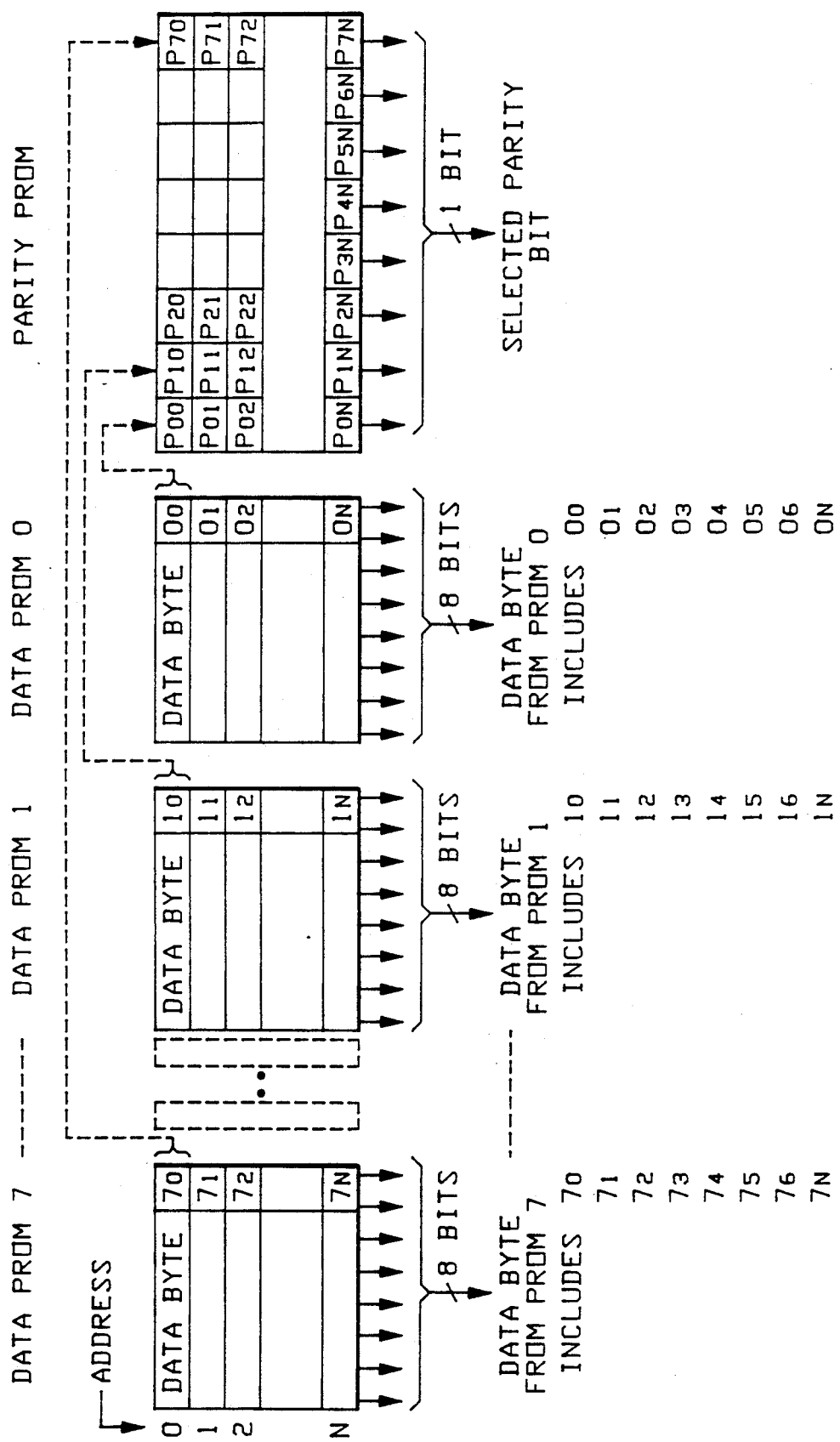

WIDTH-EXPANSIBLE MEMORY INTEGRITY STRUCTURE

FIELD OF THE INVENTION

This disclosure relates to width-expansible memory systems and particularly to the use of parity checking of data stored and retrieved from such memory systems.

CROSS REFERENCES TO RELATED APPLICATIONS

This disclosure relates to the following concurrently pending applications by the inventors James H. Jeppesen, III and Bruce E. Whittaker:

a patent application entitled "System for Memory Data Integrity" filed Nov. 22, 1989 as U.S. Ser. No. 441,821; and a patent application entitled "Multiple Memory Bank Parity Checking System" filed Nov. 22, 1989, as U.S. Ser. No. 440,558.

BACKGROUND OF THE INVENTION

In the architecture of computer systems, a major module is the memory system which works in conjunction with the processor and which memory system holds and supplies the data and instructions necessary to the operation of the system. One such type of memory system involves the use of PROM memory modules which involve programmable read-only memory units which are generally used to hold "fixed" data for us of the computer system.

The information stored in the PROM memory is critical to the integrity of system operation and such system operation can run amok should the data from the PROM memory be corrupted or altered.

Such memory units are also made up of ROM modules which involve read-only memory and which also hold significant "fixed" data.

Examples of important and significant data which may reside in a PROM or a ROM memory system are such items as:

(i) low level "bootstrap" (start-up) program code which is used to initialize a system;

(ii) specialized and unique information for system identification and configuration functions;

(iii) data integrity value information such as encryption or decryption keys.

The integrity of the ROM/PROM memory data is especially critical since a system may not yet be sufficiently initialized (up) enough at the period of initialization before other higher and more sophisticated levels of error detection are functioning operationally.

The generally common method of error detection in memory systems, whether RAMs (random access memories) or ROMs/PROMs, is the use of the "parity" data system. Parity is a method whereby "extra" data bits are stored along with the real data bits. These extra bits, called "parity bits", contain a value that is based upon the value of the actual data package under consideration. At such time as the data information is read out from memory, the parity bits are read out as well.

The parity value of the "actual data read out" is recalculated from the real data bits (via a parity logic circuit) and the calculated parity value is then compared to the parity bit or bits read out from the parity memory. If these two values are equal, then there is a high probability that the actual data read-out is valid and free from errors that may have been induced during the writing-in, the storage of, and the reading-out of the data in the memory subsystem.

In the physical hardware implementation of a parity checking system for memory, several factors are extant:

(a) extra storage elements (PROM chips) are required to store the parity bit(s);

(b) a means of collecting and checking out the parity bits must be added to the system.

One example of a parity check system is shown in U.S. Pat. No. 4,809,279 which is commonly assigned to the same ownership as this instant application. This type system is limited to only one type of parity operation (odd parity) while the instant application provides a choice factor for using odd or even parity.

In the present day commercial marketplace, standard parity-checking integrated circuit chips (IC's) are available. These devices use one parity bit for each eight bits of information (data). Thus it can be realized that one bit of extra memory must be added to the system for each eight bits (data) of system memory width. Now since most functioning practical systems have requirements for memory much wider than eight bits, this can lead to problems involving additional cost consideration and space requirements in the system.

Another complication to the use of parity systems in PROM memory structures is that standard industry PROM chips are usually made eight bits wide in configuration. Even if it were possible to find a one-bit wide PROM, there is still the consideration that it is highly desirable to build a memory structure using only "one type" of memory chip rather than a mixture of different types of chips.

Because of this impracticability, it would appear that few systems use data integrity schemes for PROM memory data. Thus the architectural arrangement presented in this disclosure provides a means for reducing the costs of parity schemes in PROM memory systems and permits uniformity of PROM module units and, most importantly, permits means for insuring the integrity of the system by permitting the detection of data corruption errors in the PROM memory banks. Because of the use of fewer memory chips and the uniformity of using the same type of memory chips, it is possible to provide considerable efficiencies in operation and cost reduction.

SUMMARY OF THE INVENTION

In order to accrue the benefits of uniformity of memory modules, low cost efficiencies, and choice of odd or even parity format, a memory subsystem for storing multiple numbers of data bytes is connected to cooperate with a parity storage memory such that each byte of data storage in the data storage memory has a corresponding parity bit stored in the parity storage memory. When the data storage memory is addressed to access and read out a byte of data, then simultaneously the address will access the corresponding parity bit from the parity storage memory. Then a parity checking module can be used to receive the read-out data from the data storage memory in order to calculate its parity and then to compare the calculated parity with the predetermined parity value received from the parity storage memory. Should any disparity occur between the two compared parity bits, then an error signal will be generated for use in the system for subsequent corrective action.

The data storage memory structure may be width-extended "laterally" with a sequence of memory chips using duplicate-type modules of the first data storage memory chip while the same type parity bit storage memory chip can be utilized to provide a parity bit for any data byte (which may constitute a data word of 8 bits) accessed from any one of the lateral memory modules for detection of any error occurrences. This provides for extensively wider words of real data which can be addressed in the memory structure.

BRIEF DESCRIPTION OF THE DRAWINGS

FIG. 1B is a schematic diagram of the associated parity check logic unit;

FIG. 2 is a schematic diagram of multiple memory chips and the related parity bits for each data word.

DESCRIPTION OF PREFERRED EMBODIMENT

Figure 1A:
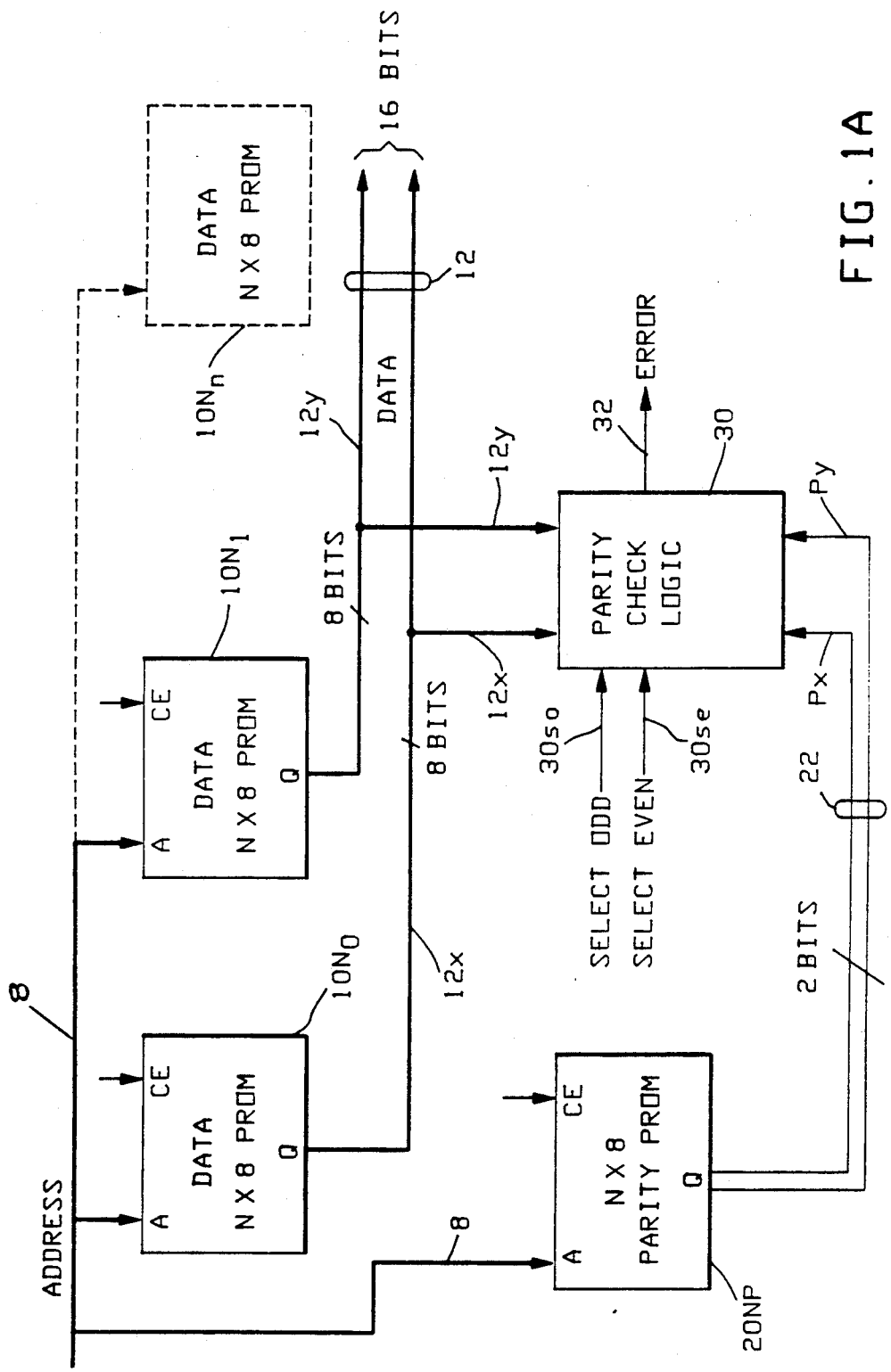
FIG. 1A is a block diagram of the width-expansible memory structure.

Referring to FIG. 1A, there is seen a PROM memory structure which is laterally expanded in width so that while each memory chip holds data words of eight bits, the final output data word on the data bus 12 may be widened to include, for example, sixteen bits. Thus the stored data word in each memory chip which may be "n" bits is expanded to a final output data word on the output data bus of $k \times n$ data bits where k is the number of memory chips storing real data words.

The memory structure of FIG. 1A permits the output data to be increased in size from eight bits to sixteen bits by virtue of the lateral expansion of the PROM chips using memory chip $10N_o$ and memory chip $10N_1$. The address bus 8 addresses data bytes in the data memory chips $10N_o$ and $10N_1$ while at the same time addressing locations in the auxiliary memory parity PROM chip 20NP. The result of this is that the data byte from the data memory chip will be accessed together with the correspondingly related parity chip from the single parity memory PROM 20NP.

The data PROM $10N_o$ of FIG. 1A provides eight bits of data on bus $12_x$ while the PROM $10N_1$ provides eight bits of data on bus $12_y$. The combination of these two buses then constitutes the sixteen bits of the final output data bus 12 which results in the expanded data word.

In FIG. 1A, the single auxiliary memory parity PROM 20NP provides a bus composed of two output lines designated $P_x$ and $P_y$. These two lines constitute the bus 22 and each one of the bit lines will carry respectively the correspondingly related parity bit for the data words accessed from PROM $10N_o$ and $10N_1$.

The parity check logic 30 of FIG. 1A is seen to receive the accessed data words (bytes) from the PROMs $10N_x$ and $10N_y$ via the buses $12_x$ and $12_y$ in order to calculate the parity values of each of the eight bits of data words accessed. Additionally, the parity logic 30 receives the related parity bits from the parity PROM 20NP on lines $P_x$ and $P_y$ so that it may perform a comparison of the predetermined parity bit from the parity PROM with the calculated parity value of the accessed data words from the data memory PROMs. The result of this comparison will determine whether or not an error signal will be transmitted on line 32 if a parity incongruity occurs.

Additionally, the system permits the versatility of choosing either odd parity format or even parity format values by use of the selection lines $30_{so}$ and $30_{se}$ which enables the parity checked logic to operate in either the odd parity format or the even parity format.

Referring to FIG. 1B, there is indicated a schematic diagram of a typically useful circuit for the parity check logic 30. Commercially available parity generators, such as those manufactured as type 74280 by Fairchild Camera and Instrument Company, Digital Division, So. Portland, Me., can be used to receive an accessed data word from one of the data memory chips and at the same time receive the correspondingly related parity bit from the auxiliary memory parity PROM.

Thus, in FIG. 1B the parity generator $30_{c1}$ can receive the accessed data word of eight bits on bus $12_x$ and also receive the accessed related parity bit $P_x$ on the single bit line input. This type parity generator can then calculate the actual parity value of the received data word accessed on bus $12_x$ and compare it with the predetermined parity bit coming in on line $P_x$. This type of parity generator chip, such as $30_{c1}$ and $30_{c2}$, will provide two outputs indicated as the odd output and the even output. These two outputs are fed to AND gates such as $32_a$ and $32_b$ which have additional inputs from a set of selection parity lines designated $30_{so}$ and $30_{se}$. By activating the odd or the even parity selection line, this system will function to operate on the selected odd or even parity format.

Likewise, as seen in FIG. 1B, a second parity generator $30_{c2}$ can receive the eight bits of an accessed data word on bus $12_y$ from data memory PROM $10N_1$ in addition to receiving the predetermined parity bit (one bit) on line $P_y$ from the auxiliary memory parity PROM 20NP. Then similarly, a pair of AND gates ($32c$, $32d$) can be used to select odd or even parity operation. The outputs of each of the AND gates are fed to an OR gate 34 which then will provide an error signal on line 32 should there be a discrepancy in the calculated parity value from that of the predetermined parity value in the auxiliary parity memory PROM 20NP.

By "extrapolating" the concept of FIG. 1A in the lateral direction, it can be seen that the memory architectural structure can utilize multiple numbers of data PROM memory chips so that while each memory chip has data words of "n" bytes, the final output data bus will provide an expanded data word of $k \times n$ bits of data to form the expanded output data word.

For example, if the structure were extended, as seen in FIG. 2, to provide eight data PROMs (data PROM 0 through data PROM 7) in a lateral configuration, then "k" would be equal to eight, and if each data byte in each of the data memory chips was eight bits (n=8), then since $8 \times 8$ would come to 64, it would be necessary that 64 predetermined parity bits be located in the auxiliary memory parity PROM so that one predetermined parity bit would be available for each data byte in each of the eight data memory PROM chips.

In FIG. 2, the parity PROM is shown with a designated set of parity bits such that $P_{oo}$ represents the parity bit for the initial data byte in the first data PROM (data PROM 0). Likewise, the block $P_{70}$ represents the predetermined parity bit for the initial data byte in the eighth data PROM (data PROM 7). With the use of a common address means, it is possible to access the correspondingly related parity bit for each one of the accessed data words from any one of the data memory chips.

Described herein has been a width-expansible memory structure which, while providing for data integrity, also permits the selection of odd or even parity usage. Since uniform type chips are used in most of the memory structure elements, cost efficiencies are realizable to provide a simple, compact and inexpensive memory structure for use in computer systems.

While the preferred embodiment indicates the specific structure of elements used, it is possible that the concept may be implemented in other fashions and should be understood to be defined by the following claims.

What is claimed is:

1. An expansible width memory structure for concatenating a plurality of n bit data words to form a final output data word of $K \times n$ bits, said memory structure comprising:
   (a) a plurality of k ROM-PROM data memory chips wherein each ROM/PROM data memory chip is a duplicate-type of the other and each data memory chip stores N data words of n bits each while providing a chip output bus of n bits;
   (b) a single auxiliary parity ROM/PROM memory chip which is a duplicate-type of said k data memory chips, said parity memory chip storing one predetermined related parity bit for each n-bit data word in each one of said k data memory chips.
   (c) address bus means connected to address each one of said ROM/PROM data memory chips and said auxiliary ROM/PROM parity memory chip;
   (d) final output data bus means of $k \times n$ bits forming said final output data word;
   (e) integrity checking means for verifying the accuracy of data accessed on said final output data bus means;
   (f) means for selecting an operating format so as to use an odd parity or an even parity check format system, said selection means connected to said integrity checking means.

2. An expansible width memory structure for concatenating a plurality of n bit data words to form a final output data word of $k \times n$ bits, said memory structure comprising:
   (a) a plurality of k ROM/PROM data memory chips wherein each ROM/PROM data memory chip is a duplicate-type of the other and each data memory chip stores N data words of n bits each while providing a chip output bus of n bits;
   (b) a single auxiliary parity ROM/PROM memory chip which is a duplicate-type of said k data memory chips, said parity memory chip sorting one predetermined related parity bit for each n-bit data word in each one of said k data memory chips.
   (c) address bus means connected to address each one of said ROM/PROM data memory chips and said auxiliary ROM/PROM parity memory chip;
   (d) final output data bus means of $k \times n$ bits forming said final output data word;
   (e) integrity checking means for verifying the accuracy of data accessed on said final output data bus means, said integrity checking means including:
      (e1) bus means to carry accessed related parity bits from said auxiliary parity ROM/PROM memory chip to a parity check logic means;
      (e2) said parity check logic means for receiving accessed data words from each one of said k data memory chips via said chip output buses and including:
         (e2a) means for calculating the parity value of each data work accessed and comparing it with each accessed predetermined related parity bit to determine whether the parity values are inconsistent and thus indicate error;
      (e3) selection means to permit said parity check logic means to operate on an odd parity or an even parity format.

* * * * *